July 31, 1962 G. J. TATNALL ETAL 3,047,259
SPEED BRAKE RETARDING MECHANISM FOR AN AIR-DROPPED STORE
Filed Nov. 25, 1959 4 Sheets-Sheet 1
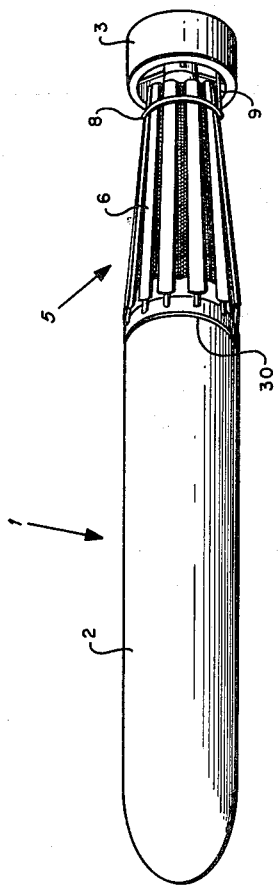
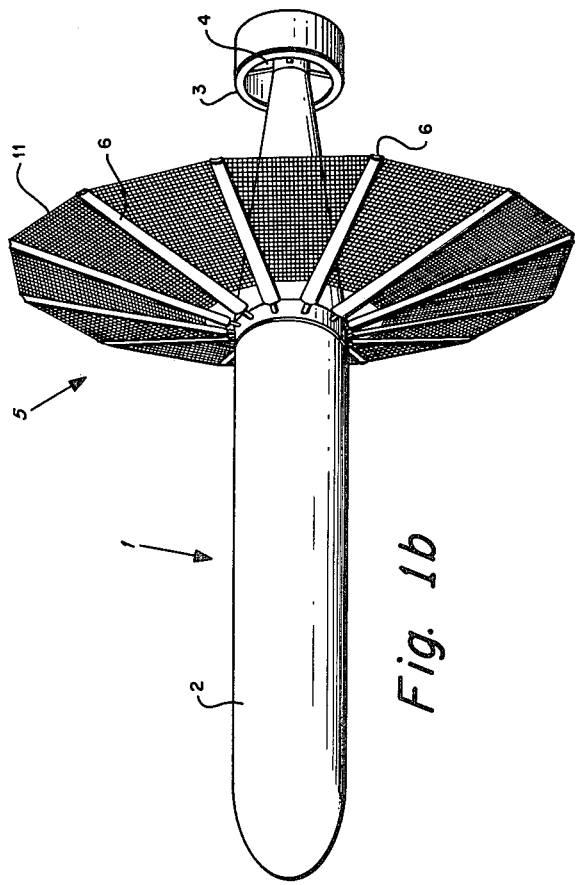
INVENTORS
GEORGE J. TATNALL
ALBERT F. SCARCELLI
BY 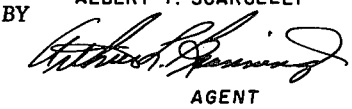
AGENT

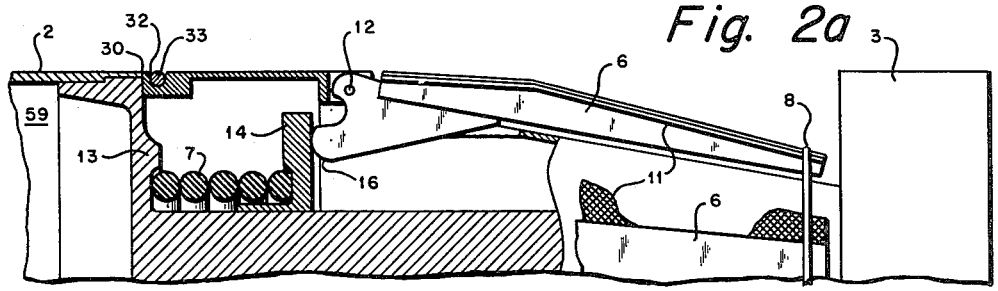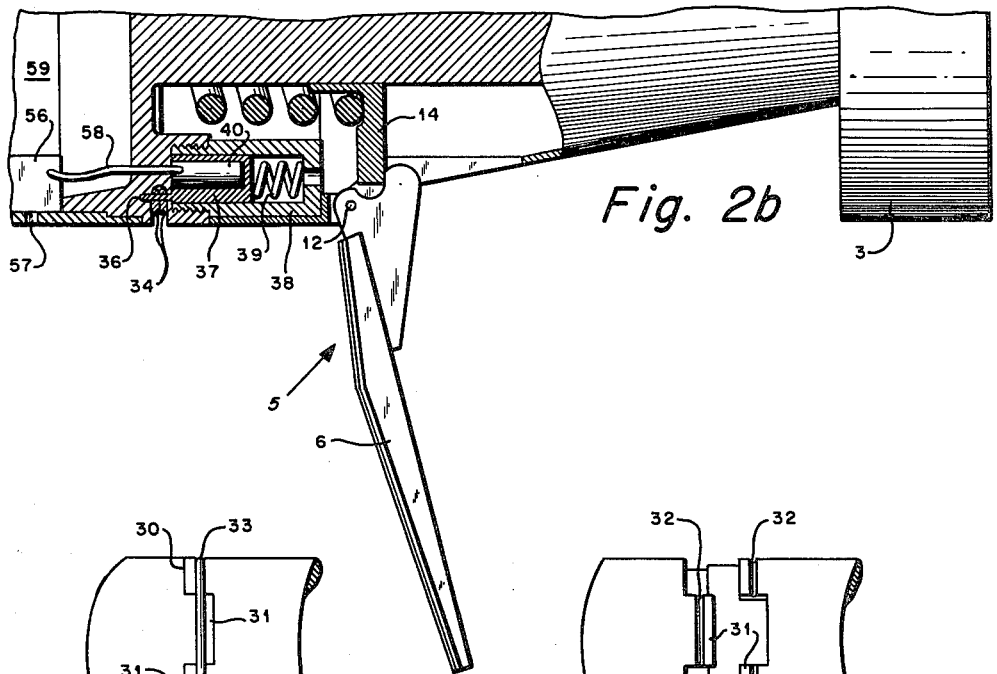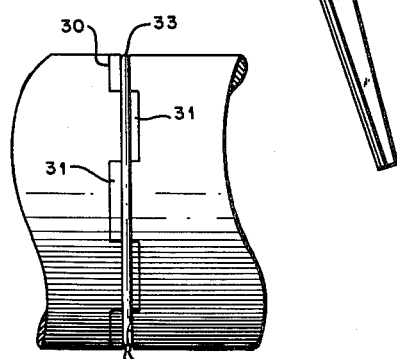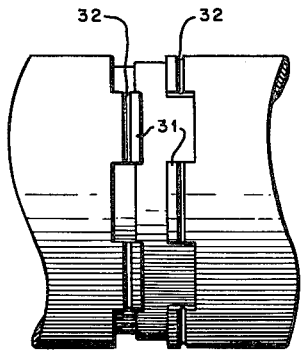

July 31, 1962 G. J. TATNALL ETAL 3,047,259
SPEED BRAKE RETARDING MECHANISM FOR AN AIR-DROPPED STORE
Filed Nov. 25, 1959 4 Sheets-Sheet 3

INVENTORS
GEORGE J. TATNALL
ALBERT F. SCARCELLI
BY
AGENT

July 31, 1962 G. J. TATNALL ETAL 3,047,259
SPEED BRAKE RETARDING MECHANISM FOR AN AIR-DROPPED STORE
Filed Nov. 25, 1959 4 Sheets-Sheet 4

INVENTORS
GEORGE J. TATNALL
ALBERT F. SCARCELLI
BY

AGENT

United States Patent Office 3,047,259
Patented July 31, 1962

3,047,259
SPEED BRAKE RETARDING MECHANISM FOR AN AIR-DROPPED STORE
George J. Tatnall, Southampton, and Albert F. Scarcelli, Hatboro, Pa., assignors to the United States of America as represented by the Secretary of the Navy
Filed Nov. 25, 1959, Ser. No. 855,473
12 Claims. (Cl. 244—138)
(Granted under Title 35, U.S. Code (1952), sec. 266)

The invention described herein may be manufactured and used by or for the Government of the United States of America for governmental purposes without the payment of any royalties thereon or therefor.

The present invention relates to a speed brake retarding mechanism for an air-dropped store and more particularly to a speed brake mechanism for an air-dropped store launched from an aircraft operative to retard the descent of said store to a low terminal velocity with minimum shock deceleration and minimum dispersion.

The prior art devices utilized to dispense a store or cylinder from an aircraft employed various means for retarding its descent in order to reduce the incidence of injury or destruction to the store or cylinder and its contents upon impact with the surface of the ground or water. Such retarding devices include the parachute, the blunt body, and the windmilling propeller or rotochute. It is frequently desirable to launch the store at relatively high velocity and at a low altitude in order to minimize dispersion. The prior art devices are unsuitable for this purpose in that high deceleration forces are applied to the store when the retarding device is brought into operation. This shock is highly objectionable in stores containing precision or sensitive components, such as are contained in sonar buoys (sonobuoys), sonar beacons and bathythermographs (BT). The prior art devices also have poor dispersion characteristics being more responsive to side forces such as oscillation of the store or cylinder and wind forces acting upon the store as it descends through the air. In the use of these devices, there is an inherent delay between the time the store is launched and the time when the retarding devices become effective. This delay introduces an unpredictable trajectory path which further amplifies dispersion.

In contrast to these techniques known to the prior art, the present invention contemplates a speed retarding mechanism or speed brake suitable for use with a shock-sensitive store launched at high or low velocity whereby the store decelerates or accelerates, respectively, to a low terminal velocity at the point of impact with the ground or water surface and which operates simultaneously to achieve a more uniform rate of deceleration of the store over the trajectory path thereof. Manifestly, the acceleration or deceleration force is maintained at a minimum value. The speed brake retarding apparatus of the present invention further obtains considerably reduced dispersion of the air-dropped store as by affording a more predictable trajectory or dive path. This is due to the inherent aerodynamic stability of the apparatus. Actual test launchings of stores incorporating the present invention held dispersion within 5% of range as compared, for example, to a rotochute type retarding device which permitted dispersion up to 40% of range.

In particular, the speed brake is especially suitable for use on a sonobuoy, sonar beacon, BT or depth charge. Additionally, the sonobuoy speed brake assembly incorporates a novel means for jettisoning or ejecting the brake assembly upon immersion in the water and the BT brake includes the additional feature of altering the brake position for controlling the rate of descent of the BT in the water.

An object of the present invention is to provide a simple, compact and low-cost speed brake apparatus for an air-dropped store with uniformly proportional retarding thereby affording low deceleration load factors.

A further object of the present invention is the provision of apparatus for minimizing shock due to deceleration or acceleration of stores launched at high or low speed, respectively.

Another object of the invention is to provide apparatus for obtaining more predictable trajectories of air-dropped stores thereby minimizing the dispersion area.

A still further object of the present invention is the provision of jettisoning mechanism for ejecting the speed brake from the main body of a store such as a sonobuoy.

Still another object of the invention is to provide apparatus for initiating operation of the speed brake retarding apparatus with minimum delay after launching.

Yet another object of the present invention is the provision of apparatus for modifying the speed brake retarding position for controlling the rate of descent of an air-dropped store, such as a BT, in water.

Other objects and many of the attendant advantages of this invention will be readily appreciated as the same becomes better understood by reference to the following detailed description when considered in connection with the accompanying drawings wherein:

FIGS. 1a and 1b diagrammatically show a general arrangement of a preferred embodiment of the speed brake assembly on a store apparatus in its retracted and extended positions, respectively;

FIGS. 2a and 2b represent longitudinal sections of the actuating device for the apparatus of FIGS. 1a and 1b, respectively;

FIG. 4b shows a section of the brake release mechanism taken on the line 4b—4b of FIG. 4a;

FIGS. 5a and 5b illustrate before and after separation, respectively, a modification of the apparatus for jettisoning the speed brake and tail cone assemblies or for projecting telescoped body sections;

Figure 3A:
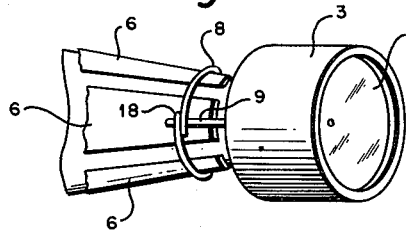
FIGS. 3a and 3b illustrate before and after actuation, respectively, the detailed structure of the stabilizer section shown in FIGS. 1a and 1b incorporating the brake release mechanism.

Referring now to the drawings, wherein like reference characters designate like or corresponding parts throughout the several views, there is shown an embodiment of the invention illustrated in FIGS. 1a and 1b. The store 1 includes a ballistic-shaped cylindrical casing 2 having a nose and tail cone section to which stabilizer duct 3 is attached by radial fins 4. A speed brake or retarding assembly 5 comprises a plurality of evenly distributed deflecting spiders or blades 6 which are individually pivoted about pins 12 (FIG. 2a) disposed near the outer circumference of casing 2. The blades can assume any one of an infinite number of positions from a fully retracted position as shown in FIG. 1a to a fully extended or spread position as represented in FIG. 1b. The blades 6 are biased toward a spreading position by an actuating coil spring 7 (FIG. 2a) which is opposed by the force produced by ram or impact fluid pressure against the frontal area of the blades 6 as the store 1 moves through a fluid medium. The blades 6 are retained in their fully retracted positions by a hoop spring or C-spring 8 which wraps around the retracted blades 6. The hoop spring 8 tends to open and release blades 6 but is restrained at its ends by an arming rod 9 as will be explained more fully below with reference to FIGS. 3a and 3b. A spring-less-type closure wire or ring is also contemplated for retaining the blades 6 instead of the hoop spring 8. The blades 6 are bridged by a flexible screen or porous webbing 11, preferably made of plastic or metal, to afford a larger frontal area thereby increasing the drag or resistance so as to retard the store an amount consistent with store weight and good aerodynamic design practice. Alternative structures and materials contemplated are blunt blades which are concave (cup-shaped) in the direction of flight, canvas webbing, or no webbing.

The actuation of blades 6 may be more readily understood by reference to FIGS. 2a and 2b. In FIG. 2a the blades are pivoted at pin 12 and are retained in the retracted position by a hoop spring 8. Actuating spring 7 abuts bulkhead 13 and urges opening plate 14 against cam faces 16 on blades 6. As shown in FIG. 2b, when hoop spring 8 is relieved, the blades 6 are forced outward by the spring 7 and open plate 14 to assume a position of balance against the ram or impact pressure imparted on the frontal area presented by the spread of the brake assembly 5. Thus, the frontal area or drag will increase proportionally as the ram pressure decreases. It should be noted that the cam faces 16 are acted on by a single opening plate 14 thus dictating uniform spreading of the brake assembly 5 around the cylinder 2. This feature assures stability in flight.

Figure 3B:
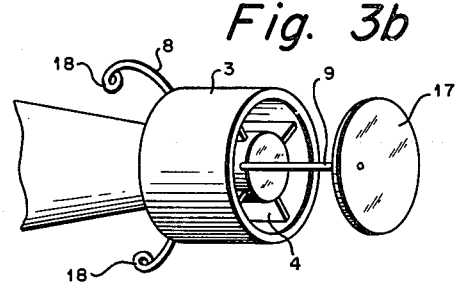

One manner in which the hoop spring 8 may be relieved from around the retracted blades 6 is illustrated in FIGURES 3a and 3b. Stabilizer duct 3 loosely supports a blow-off plate or cap 17 to which arming rod or pin 9 is fixed. Hoop spring 8 is stressed around blades 6 so that end loops 18 thereof align for simultaneously engaging pin 9. In operation, a sufficient fluid ram or impact pressure against the forward side of cap 17 causes pin 9 to release the end loops 18 and permit blades 6 to spread outwardly.

Figure 4A:
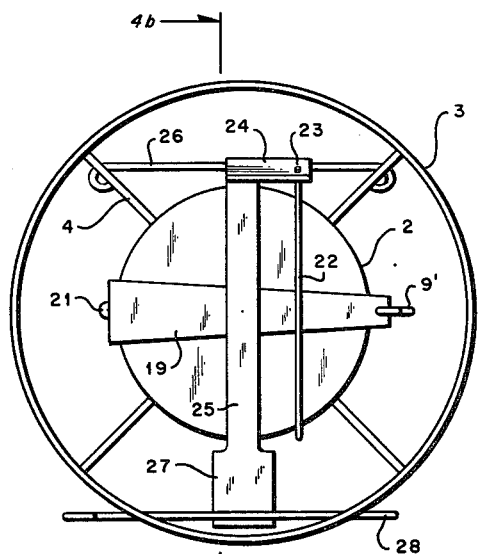
FIG. 4a illustrates an alternative embodiment of the brake release mechanism in a view taken aft of the store.
Figure 4B:
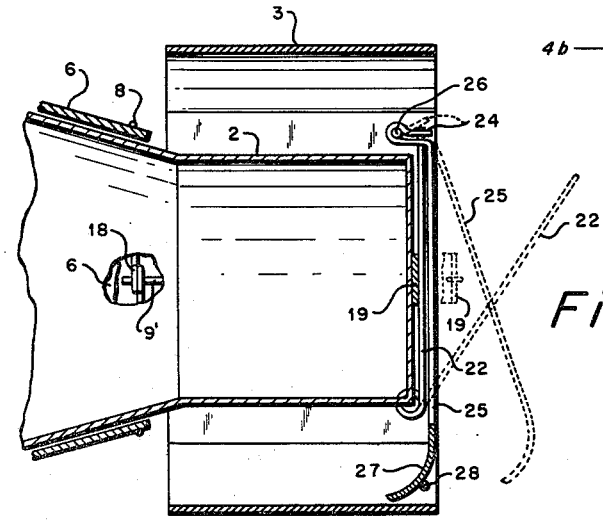

FIGS. 4a and 4b illustrate another preferred embodiment of the release mechanism. A release leaf spring 19 is fixed to the casing 2 at the aft end by a bolt or rivet 21. At the free end of the spring 19, an arming pin 9' is connected for extension through the hoop spring end loops 18 when spring 19 is stressed. The spring 19 is held in a stressed position by spring retainer 22 which is pivotally connected to casing 2 at one end and engaged through hole 23 on extension 24 of drag actuator lever 25. Actuator lever 25 pivots at one end about a stiff wire 26 and has a paddle 27 at the other end exposed to fluid impact pressure. A manually removable safety wire 28 prevents accidental tripping of the mechanism when store is not in use. In operation, wire 28 is removed, when a sufficient fluid ram or impact pressure appears against the forward side of paddle 27, lever 25 swings extension 24 clear of the retainer 22 permitting spring 19 to urge pin 9' out of the end loops 18 of hoop spring 8. Hoop spring 8 thus clears itself of the blades 6 allowing them to assume an effective retarding position in accordance with the magnitude of the fluid impact pressure. FIG. 4b illustrates the release position of the spring 19, etc. by phantom lines.

The embodiment thus described is especially suitable for any air-dropped store which contains shock-sensitive instrumentation.

FIGS. 2a, 2b, 5a and 5b illustrate an additional feature of the present invention for jettisoning the retarding and stabilizer section from the forward section of casing 2 and bulkhead 13. The main body section of casing 2 separates from the brake and tail cone section at a point illustrated as a circumferential line 30 on FIG. 1a. On FIGS. 5a and 5b this line appears as intermeshing teeth or jaws 31 on the respective sections. Grooves 32 are aligned to form a continuous circumferential groove when the sections are joined as in FIG. 5a and thus receive a hoop spring 33 having end loops 34. The hoop spring 33 tends to open but is held in the grooves 32 by the loops 34 being aligned to receive an arming pin 36 (FIG. 2b) attached to piston 37 in cylinder 38. The piston 37 is biased by spring 39 and contains a squib 40 detonated by a sea water activated battery 56 of well-known construction. When the casing 2 is immersed in sea water, the water enters a chamber 59 through holes 57 and forms an electrolyte thus generating a voltage on wire 58 leading to the squib 50. Detonation causes the piston 37 to oppose spring 39 and move pin 36 out of loops 34; spring 33 is thereby relieved to an unstressed position out of grooves 32; and the jaws 31 of the two sections disengage. Actuating spring 7 in the position shown in FIG. 2b has sufficient potential energy remaining to afford positive jettisoning or ejection of the brake and tail cone section from bulkhead 13 which is fixed to the main body section.

The embodiment of FIGS. 2a and 2b thus described is especially suitable for an air-dropped sonobuoy wherein the presence of the speed brake and tail cone assemblies on the main body section would impair other functions scheduled after the store apparatus has reached the surface of the water.

Figure 6A:
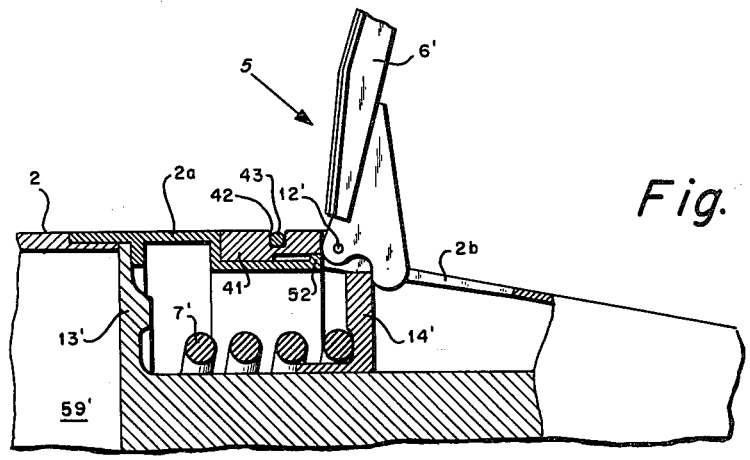
FIGS. 6a, 6b and 6c represent before and after actuation a modification of the device of FIGS. 2a and 2b for reducing the retarding effect of the speed brake apparatus.
Figure 6B:
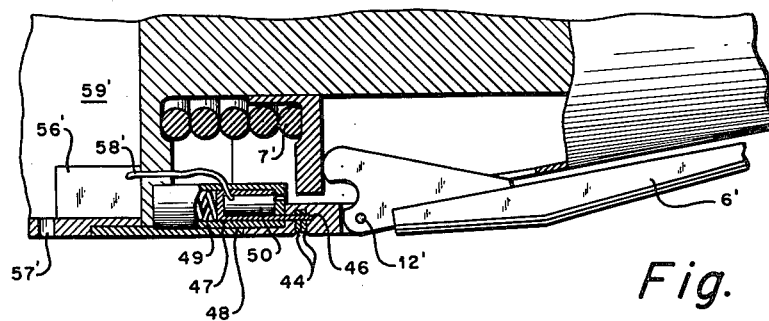
Figure 6C:
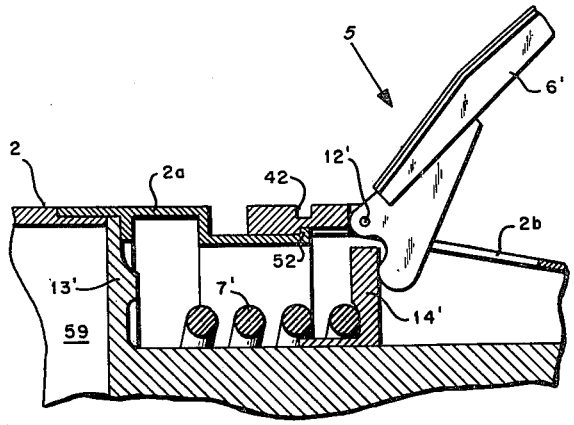

FIGS. 6a, 6b and 6c represent an additional feature of the present invention for modifying the spring bias of the speed brake assembly 5. The casing 2 is constituted by a main body section 2a telescopically engaged with brake and tail cone section 2b by intermeshing jaws 41 of the two sections. Similar to the structure for the jettisoning means discussed above in connection with FIGS. 2a, 2b, 5a and 5b, circumferential jaw grooves 42 are aligned to form a continuous groove around the casing 2 and thus receive hoop spring 43 having end loops 44. The hoop spring 43 tends to open but is held in the grooves 42 by the loops 44 being aligned to receive an arming pin 46 attached to a piston 47 in cylinder 48. The piston 47 is biased by spring 49 and contains a squib 50 detonated by a sea water activated battery 56'. When casing 2 is immersed in sea water, the water enters chamber 59' through holes 57' and forms an electrolyte thus generating a voltage on wire 58' leading to squib 40. Detonation causes the piston 47 to oppose spring 49 and move pin 46 out of end loops 44; spring 43 is thereby relieved to an unstressed position out of grooves 42; and the jaws 41 of the two sections telescopically slide apart. The section 2b is urged away from bulkhead 13' by actuating spring 7' to the extent permitted by limit or stop 52. FIGS. 6a and 6b represent this particular embodiment with the speed brake assembly 5 in the fully spread and fully retracted positions, respectively. FIG. 6c shows the position of FIG. 6a after the bias of actuating spring 7' has been modified by telescoping sections 2a and 2b. It should be noted, that for a given load applied against the frontal area of the brake assembly 5, the inclination with respect to direction of flight of the blades 6 will decrease after the sections 2a and 2b have been projected.

The embodiment of FIGS. 6a, 6b and 6c thus described is especially suitable for an air-dropped BT which measures temperatures as it descends in the ocean or other deep bodies of water. After the speed brake assembly has served its launching functions for a BT, it is employed for controlling its rate of descent. Since the fluid medium is now water instead of air, and the descent is considerably slower, the frontal area presented by the speed brake assembly 5 is modified by reducing the spring bias for any given inclination of the blades 6.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. In a store apparatus adapted to be launched from an aircraft, means for controlling the descent to a low terminal velocity with minimum shock deceleration and minimum dispersion, comprising: a container ballistic-shaped for low drag in flight; stabilizing fins attached to the aft end of said container; a plurality of deflecting blades each pivotally connected at one end and equally spaced about the circumference of said container for rotation about an axis transverse to said container, the other end of each blade being disposed rearwardly of said one end; a cam surface at said one end of each blade; an opening plate abutting each blade at its cam surface; an actuating spring operatively disposed between said plate and said container such that said other ends of the blades are uniformly biased outwardly and forwardly of said container as a function of the air impact pressure; release mechanism supported by the stabilizing fins including a hoop spring positioned for retaining the blades against the container and a ram pressure responsive means operatively connected to the hoop spring for relieving the hoop spring from the retaining position at a predetermined pressure.

2. In a store apparatus adapted to be launched from an aircraft, means for controlling the descent to a low terminal velocity with minimum shock deceleration and minimum dispersion, comprising: a casing, a retarding assembly pivotally attached to said casing for varying the frontal area of said casing, resilient means disposed between said casing and said assembly for uniformly and proportionately positioning the retarding assembly in accordance with ram air pressure, and a ram air pressure actuated release mechanism integrally attached to said casing for maintaining said retarding assembly ineffective until a predetermined ram air pressure.

3. In apparatus adapted to be dispensed from an aircraft, means for controlling the descent to a low terminal velocity with minimum shock deceleration and minimum dispersion, comprising, in combination: a streamlined cylindrical store with stabilizing fins, a plurality of deflecting elements pivotally attached about the circumference of said store, resilient means disposed between said store and said elements urging said elements toward a spreading position, and release mechanism operatively connected between said store and said elements for maintaining said elements in a retracting position until a predetermined ram air pressure.

4. Apparatus as defined in claim 1 wherein said container is formed by separable fore and aft sections, said aft section supporting said blades and said fins, including hoop spring means constructed and arranged for securing said sections together, a sea water activated battery, squib means detonated by said battery for releasing said hoop spring means, and said actuating spring further disposed for affording a residual force for jettisoning said aft section when the hoop spring means is released.

5. A sonobuoy adapted to be launched from an aircraft comprising, in combination: a buoyant main body, a flight retarding and stabilizing section releasably attached to said main body and having deflecting blades adapted for extending outwardly from said section in accordance with ram air pressure, release mechanism integrally connected to said section for rendering said blades ineffective until a predetermined ram air pressure, and jettisoning means for releasing and ejecting said section from said main body whereby said main body can float in a desired manner.

6. A store apparatus for launching from an aircraft comprising, in combination: a casing, a spring-biased retarding assembly attached to said casing, and means for changing the spring bias.

7. Apparatus as defined in claim 1 wherein said container includes fore and aft sections slidably engaged, said pivotal connections being on the aft section, and including: hoop spring means constructed and arranged for securing said sections together and for preventing sliding, a sea water activated battery, squib means detonated by said battery for releasing said hoop spring means, and stop means for limiting the sliding, whereby said actuating spring bias is decreased for a given deflecting blade position.

8. A store apparatus adapted to be launched from an aircraft comprising: a main section, an auxiliary section telescopically and slidably engaged to said main section including a retarding means pivotally attached to said auxiliary section for varying drag, resilient means disposed between said main section and said retarding means for biasing said retarding means toward a maximum drag position, and seawater responsive means for sliding the auxiliary section a predetermined amount relative to said main section whereby the biasing is decreased for all positions of said retarding means when the apparatus becomes submerged in water.

9. In a bathythermograph adapted to be launched from an aircraft, means for controlling the rate of descent sequentially in different fluids, comprising, in combination: a main body, a flight retarding and stabilizing section telescopically and slidably engaged to said main section, a plurality of deflecting blades connected at one end to said section, means biasing said deflecting blades outwardly from said section in accordance with total air pressure, release mechanism integrally attached to said section for rendering said blades ineffective until a predetermined ram air pressure, and means for sliding the retarding and stabilizing section relative to said main body whereby the bias is decreased.

10. A dive brake device for a ballistic-shaped missile comprising: a plurality of deflecting blades formed to be equiangularly displaced about the circumference of the missile and pivotally connected at one end of each blade for rotation about an axis transverse to the longitudinal axis of the missile, the other end of each blade being disposed rearwardly, a cam surface fixed to each of said one ends, an opening plate simultaneously abutting each of said cam surfaces, a first spring operatively disposed between said plate and a bulkhead of said missile such that the other ends of said blades are uniformly biased outwardly and forwardly of said missile as a function of the air impact pressure whereby the missile descends to a low terminal velocity with minimum shock deceleration and minimum dispersion.

11. Apparatus for retarding a missile in flight comprising: a plurality of deflecting elements formed to be equiangularly and circumferentially mounted about said missile, said elements movable to increase the drag in flight uniformly and proportionately to ram air pressure, spring means positioned between the missile and said elements for biasing said elements toward the effective drag position, whereby the missile descends to a low terminal velocity with minimum dispersion.

12. Actuating mechanism for a missile in flight comprising: closure means for securing apparatus on a missile, an elongated resilient means fixed at one end to the missile and connected to said closure means at the other end biasing said closure means to an unsecuring position, a retaining rod pivoted at one end on the missile, paddle means pivotally connected at one end to the missile and having a relatively large flat surface exposed to the ram pressure at the other end, the pivotal end of said paddle further including means releasably connected to the other end of said said rod so that said resilient means is restrained against biasing said closure means to the unsecuring position, whereby said closure means is biased to an unsecured position at a predetermined ram pressure.

References Cited in the file of this patent

UNITED STATES PATENTS

| | | |
|---|---|---|
| 1,478,677 | Robers | Dec. 25, 1923 |
| 1,777,188 | Wiley | Sept. 30, 1930 |
| 1,908,243 | Herrick | May 9, 1933 |
| 2,183,824 | Smith | Dec. 19, 1939 |

(Other references on following page)